United States Patent [19]

Sawai

[11] Patent Number: 5,604,632
[45] Date of Patent: Feb. 18, 1997

[54] SCREEN FIXING STRUCTURE

[75] Inventor: Yasuhiko Sawai, Tokyo, Japan

[73] Assignee: Mitsubishi Denki Kabushiki Kaisha, Tokyo, Japan

[21] Appl. No.: 634,231

[22] Filed: Apr. 18, 1996

[30] Foreign Application Priority Data

Jan. 8, 1996 [JP] Japan ............................. 8-001004

[51] Int. Cl.$^6$ ................................................ G03B 21/56
[52] U.S. Cl. ........................... 359/443; 359/453; 359/457; 359/460
[58] Field of Search .................................... 359/443, 453, 359/457, 460

[56] References Cited

U.S. PATENT DOCUMENTS 4,984,871  1/1991  Martinez ................................. 350/117
5,317,449  5/1994  Furuno et al. ......................... 359/443

FOREIGN PATENT DOCUMENTS 59-171470  11/1984  Japan.
7-56237    3/1995   Japan.

Primary Examiner—Safet Metjahic
Assistant Examiner—D. P. Malley
Attorney, Agent, or Firm—Burns, Doane, Swecker & Mathis, LLP

[57]  ABSTRACT

A screen fixing structure comprises a screen, a frame, an edge side rectangular frame fixed at the edge part of the screen, a holder holding the edge side rectangular frame, holding brackets having an elongated hole, and bushes and screws inserted into the elongated holes and pressing the holding brackets to the frame side. The holding brackets are fixed with the bushes so as to be able to slide freely. Thereby, the screen is fixed so as to expand and contract freely without the movement of the joints of the screen.

7 Claims, 6 Drawing Sheets

SCREEN FIXING STRUCTURE

BACKGROUND OF THE INVENTION

1. Field of the Invention

This invention relates to a screen fixing structure, and more particularly relates to a transparent screen fixing structure to be applied to a four-surface multi-projection display that projects light onto the back surface of a liquid crystal screen.

2. Description of the Prior Art

FIG. 6 is an exploded perspective view showing a conventional screen fixing structure for a projection display. In the figure, reference numeral 1 denotes a screen called a thick type screen. The screen 1 is composed of a lenticular lens 1a made of an acrylic resin and having a thickness of about three millimeters and a Fresnel lens 1b made of an acrylic resin and having a thickness of about three millimeters; the tops of both the lenses 1a and 1b are affixed to each other with a pressure sensitive adhesive double coated tape 9.

Reference numeral 7 denotes holders; the cross sections of them are formed like a crank; one side edges of the holders 7 are hung on the fringes of the screen 1, and the other side edges of them are fixed to acceptance seats formed on the fringes of a frame 8 by means of screws 6 for holding the screen 1. The holders 7 are disposed on four sides of the screen 1; the screen 1 is fixed to the frame 8 by being strongly pressed by the holders 7 disposed on the upper side of the screen 1. The holders 7 disposed on the other sides of the screen 1 fix the screen 1 to the frame 8 loosely in such a degree that the screen 1 does not move much between the frame 8 and the holders 7 owing to the influence of external force or the like.

The frame 8 and the holders 7 are generally made of metal or plastic.

Next, the operation thereof will be described.

When the screen 1 expands due to the change of temperature and humidity in the state of the screen 1 fixed as described above, the force that extends the screen 1 to the right and the left directions and the down direction where the screen 1 can move works on the screen 1 greatly owing to the rigidity of the screen 1, so that the screen 1 slips to move by the amount of the expansion thereof between the frame 8 and the holders 7.

The constriction of the screen 1 owing to the change of temperature and humidity also makes the screen 1 slide to move into the direction opposite to the direction at the time of the expansion thereof by the amount of the constriction between the frame 8 and the holders 7.

The above-mentioned structure prevents the large warp and the large deformation of the screen 1 by disposing the holders 7 at appropriate positions on the frame 8 for holding the screen 1 with the pressing force having the strength in the degree capable of allowing the extension and the constriction of the screen 1.

Furthermore, FIG. 7 is a partial perspective view showing a main part of another conventional screen fixing structure disclosed in, for example, Japanese Unexamined Publication of a Utility Model No. 171470/84 (Jikkai-Sho No. 59-171470). FIG. 8 is a back view of the screen fixing structure shown in FIG. 7. In these figures, reference numeral 1 denotes a screen composed of the lenticular lens 1a and the Fresnel lens 1b opposed to the lenticular lens 1a. Reference numeral 16 denotes a frame for fixing the screen 1 on it. Reference numeral 20 denotes the cuts of the shape of letter U and formed at the central parts of the four sides of the screen 1 respectively so as to penetrate the parts of the screen 1.

Reference numeral 24 denotes checks inserted into the cuts 20 and fixed on the frame 16; the checks 24 have heads 26 whose diameters are larger than the widths of the cuts 20.

The screen 1 is disposed to be fixed between the heads 26 and the frame 16. The lenticular lens 1a and the Fresnel lens 1b are pressed to each other to be fixed in a degree capable of moving in the direction of the cuts 20 mutually.

Next, the operation thereof will be described.

As shown in FIG. 8, when the screen 1 expanded (to the degree shown by the broken line) from the ordinary fitted state (shown in the solid line) thereof owing to the change of temperature and humidity, the lenticular lens 1a and the Fresnel lens 1b mutually move to the direction of the cuts 20 for preventing the large distortion of the screen 1 itself.

The conventional screen fixing structures are formed as described above. If the conventional structures are applied to a four-face multi-projection display using, for example, liquid crystal displays as light bulbs, the amount of the warp of the screen, which warp causes the distortion of a picture, must be as small as possible, and the joint parts of the screen must not move even when the screen expands or contracts, because the distortion of a picture cannot eclectically be corrected owing to the structure of the screen. But, the conventional screen fixing structures cannot satisfy the above-mentioned conditions. Consequently, the conventional screen fixing structures have the defect that good pictures cannot be obtained because pictures projected from a plurality of projectors cannot constitute a complete picture owing to the warp of the screen and the movements of the joint parts thereof.

The conventional screen fixing structures have not the particular reinforcing means for a screen which means can effectively prevent the generation of a warp and be easily fabricated and adjusted. Consequently, the conventional structures have the defect that good pictures cannot be obtained because the warps, which have been generated owing to the expansion or the constriction of the screen caused by the changes of temperature and the like after the fabrication of the screen, have been accumulated to produce a great warp over the whole large screen.

Furthermore, the conventional screen fixing structure has also the defect that its reliability decreases because the warp and the distortion of the screen becomes easy to generate under the circumstances where the screen is apt to receive vibrations and impulses owing to the lack of the reinforcing means.

SUMMARY OF THE INVENTION

In view of the foregoing, it is an object of the present invention to provide a screen fixing structure wherein the amount of the warp of the screen is small to be nearly zero and the movement of the joint parts of the screen can be prevented even when the screen expands or contracts, and wherein good pictures can thereby obtained even if the screen fixing structure is applied to a multi-projection display using liquid crystal displays as light bulbs.

It is another object of the present invention to provide a screen fixing structure whose fabrication and adjustment are easy.

According to the first aspect of the present invention, for achieving the above-mentioned objects, there is provided a screen fixing structure comprising a screen, a frame for securing the screen, a frame body fixed to the edge of the screen, a holder pressing the frame body to the frame for holding it, holding brackets having an elongated hole and disposed at the central parts of respective sides of the frame body, and regulation means inserted into the elongated holes and pressing the holding brackets toward the frame side.

A reinforcing beam may be fixed on the surface of the screen on the picture projecting means side of the screen for reinforcing at least a joint part of the screen.

A groove part may be formed on the surface of the screen where the reinforcing beam is fixed so that the reinforcing beam can engage with the groove part.

A reinforcing beam may be fixed to the frame in the state of being attached to the surface of the screen on the side of the picture projecting means for reinforcing at least a joint part of the screen.

A groove part may be formed on the surface of the screen where the reinforcing beam is attached so that the reinforcing beam can be engaged with the groove part.

The reinforcing beam may be made of a light metal.

BRIEF DESCRIPTION OF THE DRAWINGS

Further objects and advantages of the present invention can be more fully understood from the following detailed description taken in conjunction with the accompanying drawings, in which.

DETAILED DESCRIPTION OF THE PREFERRED EMBODIMENTS

Preferred embodiments of the present invention will now be described in detail with reference to the accompanying drawings.

Embodiment 1.

Figure 1:
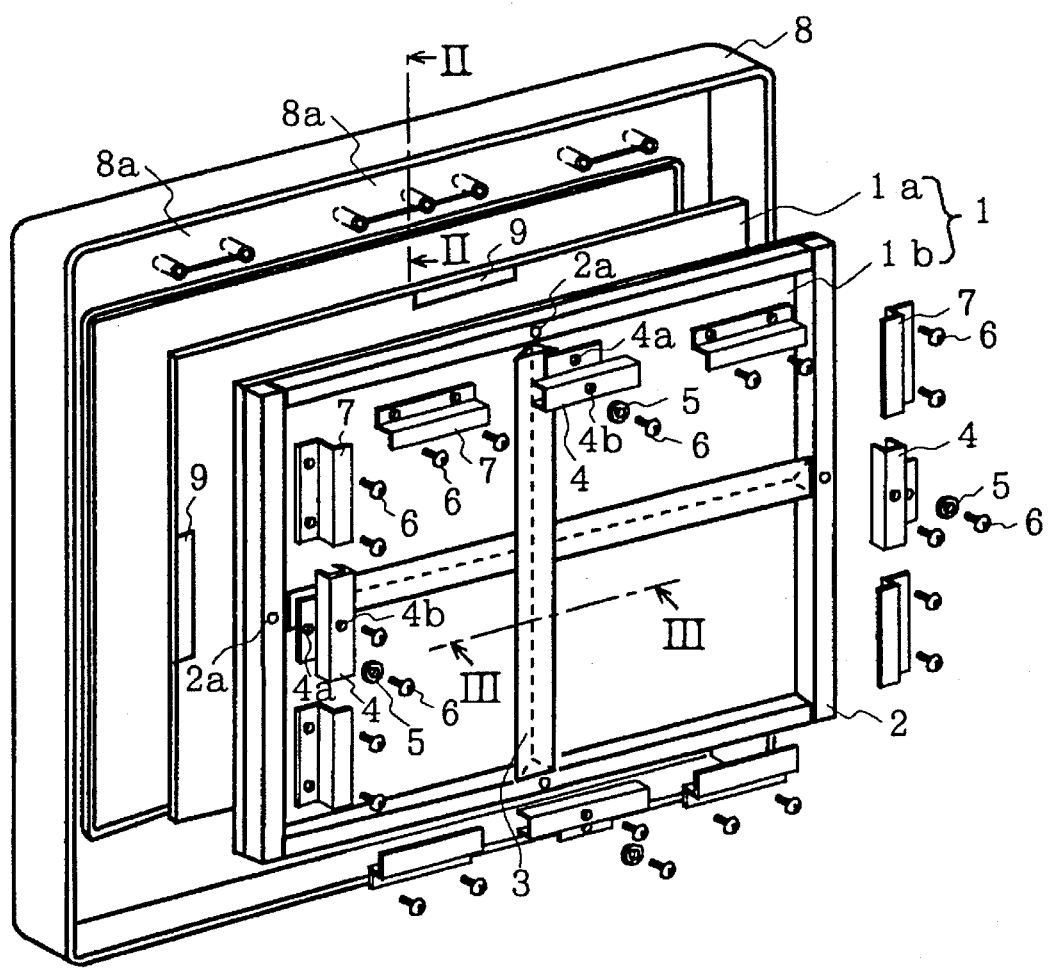
FIG. 1 is an expanded perspective view showing the screen fixing structure of a first embodiment (embodiment 1) of the present invention.
Figure 2:
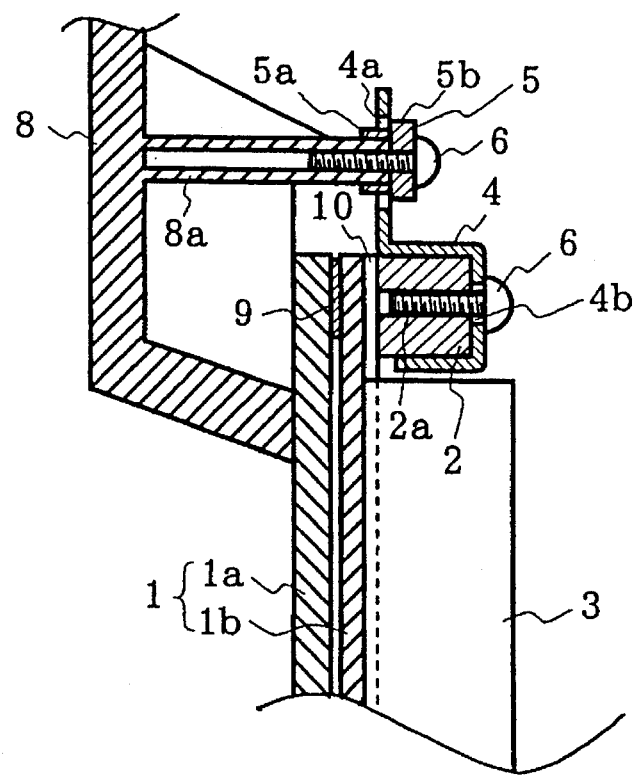
FIG. 2 is a cross sectional view taken along the line II—II of the screen fixing structure shown in FIG. 1 after being fabricated.
Figure 3:
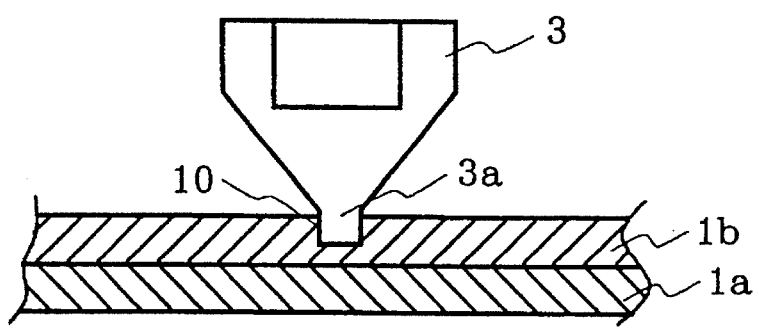
FIG. 3 is a cross sectional view taken along the line III—III of the screen fixing structure shown in FIG. 1 after being fabricated.

FIG. 1 is an expanded perspective view showing the screen fixing structure of the embodiment 1 of the present invention; FIG. 2 is a cross sectional view taken along the line II—II of FIG. 1 after the screen was fabricated; FIG. 3 is a cross sectional view taken along the line III—III of FIG. 1 after the screen was fabricated. In the figures, reference numeral 1 denotes a screen receiving light projected from a picture projecting means which is not shown. The screen 1 is composed of the lenticular lens 1a and the Fresnel lens 1b; the central parts of four sides of respective lenses 1a and 1b are affixed to each other with the pressure sensitive adhesive double coated tapes 9 respectively. Both of these lenticular lens 1a and the Fresnel lens 1b are made of an acrylic resin and having a thickness of about three millimeters respectively. There are grooves (groove parts) 10 formed by machining or the like at the joint parts of the Fresnel lens 1b, namely the parts connecting the central parts of respective sides of the Fresnel lens 1b; each of the grooves 10 has the width of three millimeters and the depth of about one through one point five millimeters, and the cross section thereof is formed like letter U.

Reference numeral 2 denotes an edge side rectangular frame (frame body) formed as a prism made of an acrylic resin having a coefficient of linear expansion equal or approximate to that of the Fresnel lens 1b; the frame 2 is affixed on the edge of the Fresnel lens 1b with pressure sensitive adhesive double coated tapes 9 or adhesive agents. Reference numeral 2a denotes screw holes cut at the central parts of respective sides of the edge side rectangular frame 2.

The edge side rectangular frame 2 is glued so that the screw holes 2a coincide with the joint central parts of the Fresnel lens 1b. The centers of the Fresnel lens 1b and the edge side rectangular frame 2 thereby coincide with each other; the point of the coincidence can be used as a reference for determining the positions of the lens 1b and the frame 2.

Reference numeral 3 denotes a reinforcing beam shaped as a cross and made of an acrylic resin; the beam 3 has an engaging part 3a engaging with the groove 10 formed on the Fresnel lens 1b as shown in FIG. 3; the cross sectional shape of the beam 3 is a triangle. The beam 3 is fixed to the Fresnel lens 1b with it's engaging part 3a engaged and glued to the groove 10. The coefficient of linear expansion of the reinforcing beam 3 is set as a value equal or approximate to that of the Fresnel lens 1b.

Reference numeral 4 denotes holding brackets made of metal and formed so as to be able to hold the central parts of respective sides of the edge side rectangular frame 2, namely the parts corresponding to the joint positions of the screen 1; elongated holes 4a and screw holes 4b are cut in the brackets 4.

The elongated holes 4a are formed in an ellipse of an size capable of absorbing the amounts of the expansion and the contraction of the screen 1. The holding brackets 4, thus formed, is fixed to the edge side rectangular frame 2 with screws 6 in the state that the positions of the screw holes 4b of the brackets 4 coincide with the positions of the screw holes 2a of the frame 2.

Reference numeral 5 denotes bushes (regulation means) made of plastics and so forth having the nature of self-lubrication; the bushes 5 have fixing parts (regulation means) 5a and heads (regulation means) 5b; the fixing parts 5a are formed so as to be able to be inserted into the elongated holes 4a of the holding brackets 4 and fitted into the acceptance seats 8a formed at suitable positions of the frame 8; the heads 5b are formed at one ends of the fixing parts 5a and formed in a size not to be inserted into the elongated holes 4a. The bushes 5 are thereby able to be fixed to the acceptance seats 8a with the screws 6.

That is to say, the holding brackets 4 are fixed to the acceptance seats 8a so as to be able to slip in parallel to the surface of the screen 1 by means of the bushes 5, the screws 6 and the elongated holes 4a.

Reference numeral 7 denotes holders pressing to hold the screen 1 by hanging the one ends of them on the edge side rectangular frame 2 and fixing the other ends of them to the acceptance seats 8a of the frame 8 with the screws 6. The holders 7 are disposed on the both sides of the respective holding brackets 4.

Next, the operation thereof will be described.

When the screen 1 expands to become larger owing to the changes of temperature, humidity or the like, the edge side rectangular frame 2, which is glued to be fixed to the screen 1 as a body with it, extends in a degree identical to the expansion of the screen 1. In this case, the holding brackets 4 can move only in the directions of the major axes of the elongated holes 4a, and consequently, the brackets 4 slip into those directions in reference to the heads 5b of the bushes 5. When the screen 1 contracts, the brackets 4 can move into the opposite directions.

As described above, the screen 1 can expands and contracts without shifting the mechanical center axes thereof (the joint positions of the screen).

The reinforcing beam 3 formed as a body with the screen 1 expands and contracts as a body with the screen 1 even if the changes of temperature and humidity occur, and thereby the reinforcing beam 3 does not exert bad influences on the expansion and contraction mechanism.

In addition to it, since the reinforcing beam 3 works as the reinforcing member of the joint parts in a body with the Fresnel lens 1b, the amount of the warp of the whole screen 1 can be reduced nearly to zero. Moreover, the reinforcing beam 3 can also perform the role of a shading plate blocking off the unnecessary light from an adjoining projector to prevent the bad interference of the light.

Since the grooves 10 are previously formed on the Fresnel lens 1b, the adjustment of the position of the reinforcing beam 3 at the time of the fabrication thereof becomes unnecessary.

In the description of this embodiment 1, the elongated holes 4a are described as an ellipse, but they may be formed as a cut of a rectangle or a letter U.

The shapes of the reinforcing beam 3 and the grooves 10 are also formed as a cross, but they can be formed in other shapes provided that the shapes correspond to the joint positions of the screen 1.

As described above, the amount of the warp of the screen 1 can be small nearly to zero and the joint parts of the screen 1 can be fixed not to move at the time of the expansion and the contraction of the screen 1 according to the present embodiment, even if the embodiment is applied to a four-surface multi-projection display using liquid crystals as light bulbs. Thereby, good pictures can be obtained.

Embodiment 2.

The parts corresponding to those shown in FIG. 1 through FIG. 3 concerning above-mentioned embodiment 1 are denoted by the same reference characters as those shown in FIG. 1 through FIG. 3, and the descriptions about them will be omitted.

Figure 4:
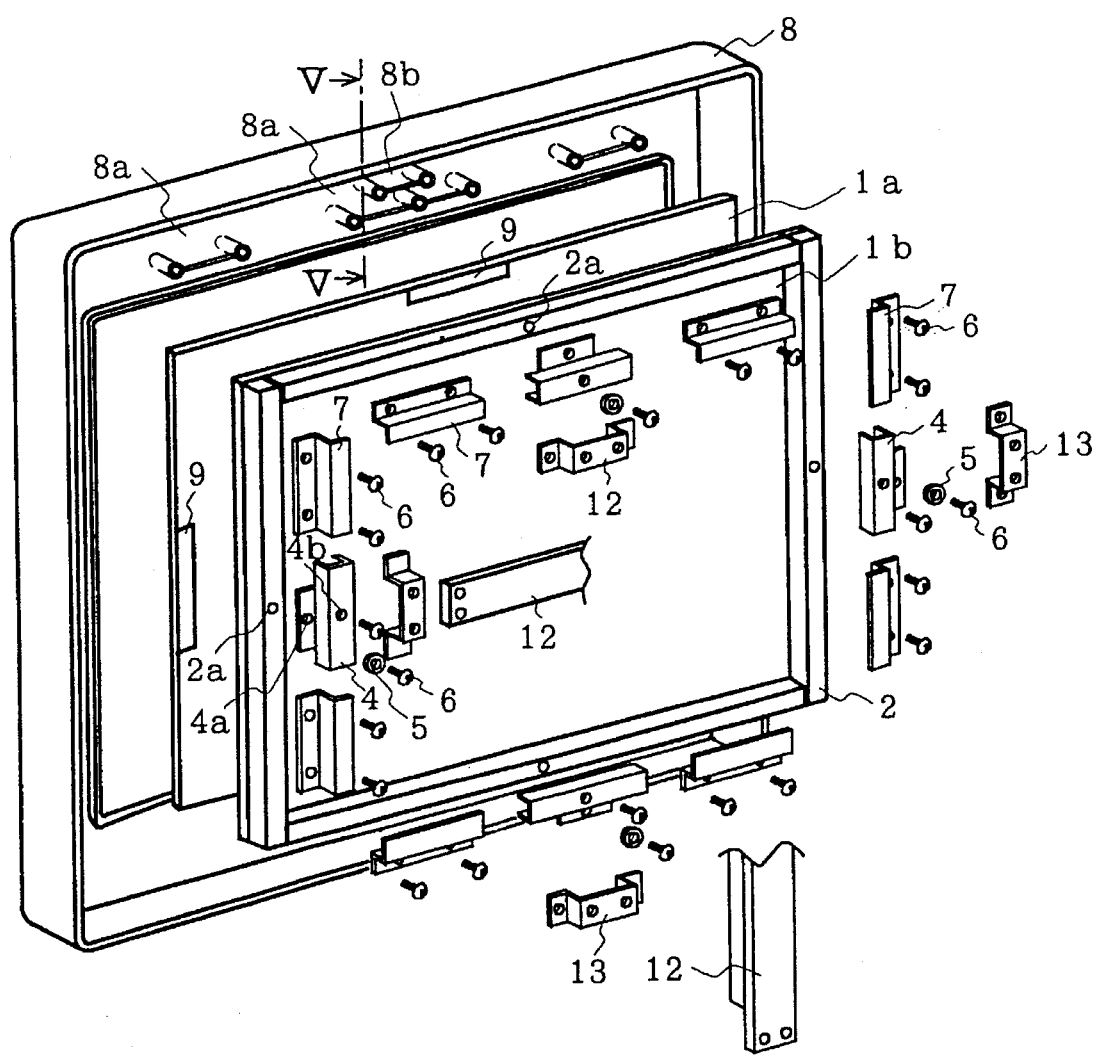
FIG. 4 is an expanded perspective view showing the screen fixing structure of a second embodiment (embodiment 2) of the present invention.
Figure 5:
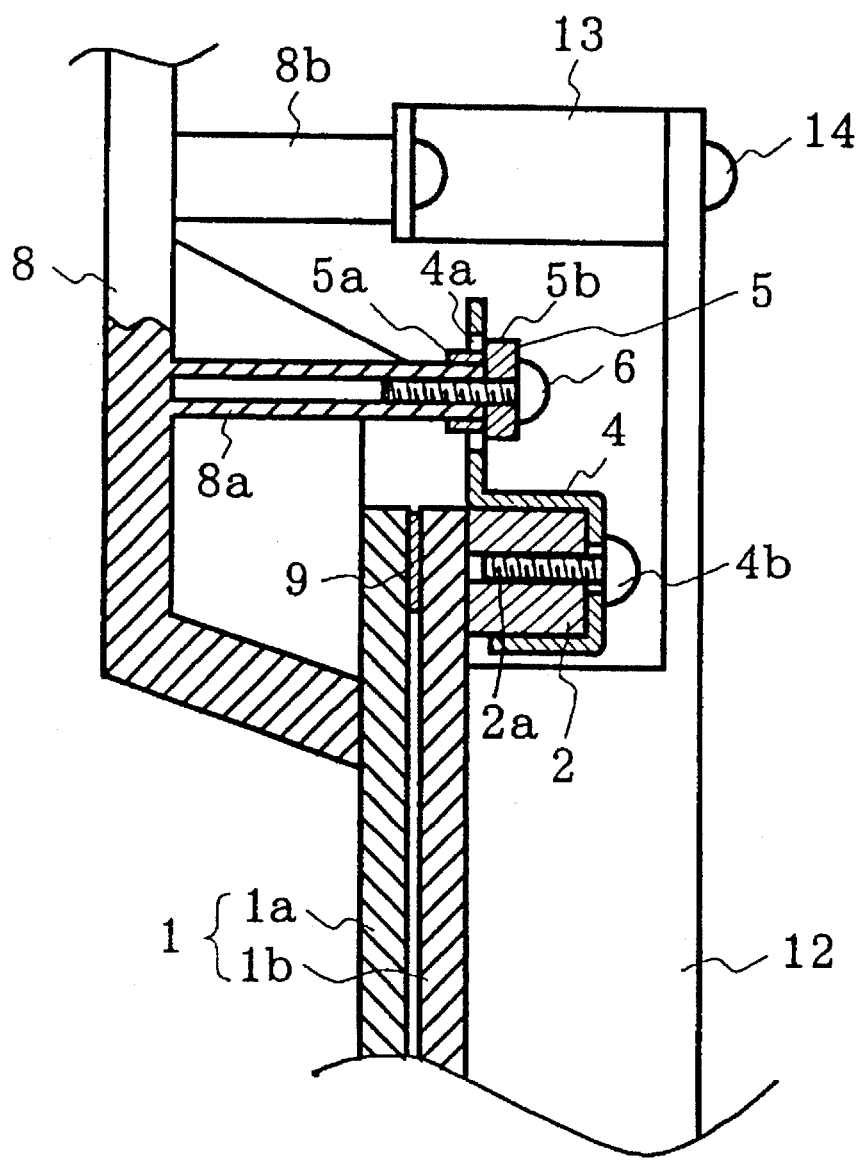
FIG. 5 is a cross sectional view taken along the line V—V of the screen fixing structure shown in FIG. 4 after being fabricated.
Figure 6:
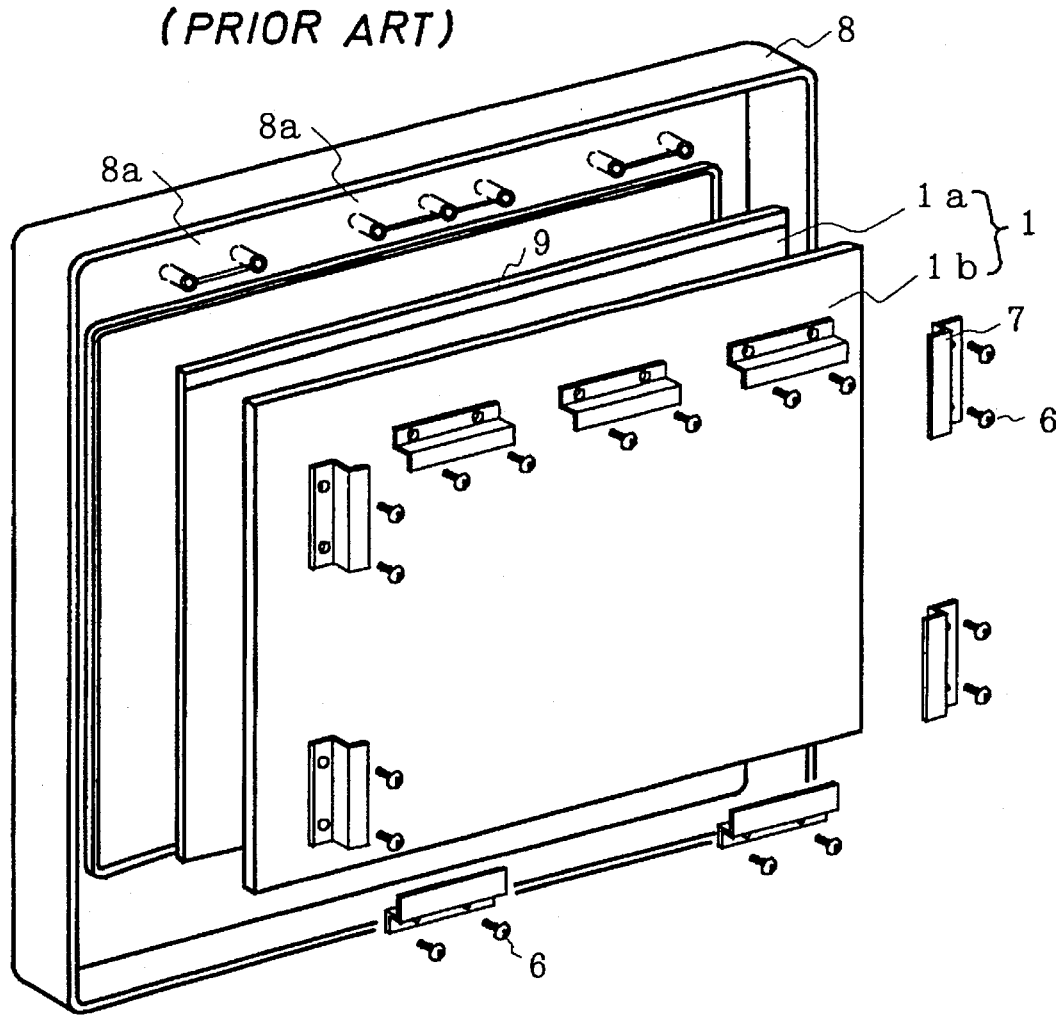
FIG. 6 is an expanded perspective view showing a conventional screen fixing structure.
Figure 7:
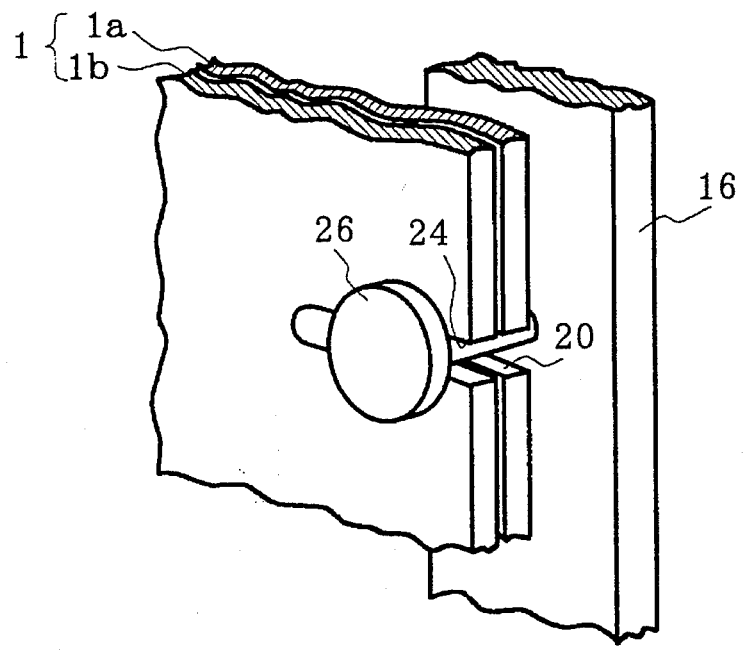
FIG. 7 is a partial perspective view showing a main part of another conventional screen fixing structure.
Figure 8:
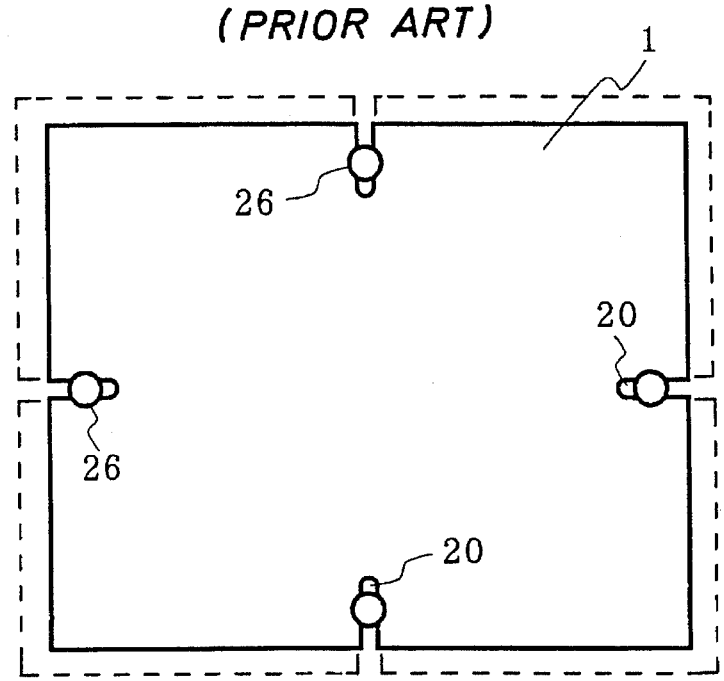
FIG. 8 is a back view of the screen fixing structure shown in FIG. 7.

FIG. 4 is an exploded perspective view showing the screen fixing structure of the embodiment 2 of the present invention. FIG. 5 is a cross sectional view taken along the line V—V of the screen fixing structure shown in FIG. 4 after being fabricated. In these figures, reference numeral 8b denotes acceptance seats having screw holes. Reference numeral 12 denotes a reinforcing beam made of a light metal such as aluminum and suppressing the hollowed deformation of the screen 1; screw holes are formed at the ends of the reinforcing beam 12.

Reference numeral 13 denotes mounts for fixing the ends of the reinforcing beam 12 to the acceptance seats 8b of the frame 8 with screws 14; the mounts 13 have prescribed screw holes. The cross sections of the mounts 13 are formed like a hat.

It need scarcely be said that the position of the reinforcing beam 12 is disposed at the positions corresponding to the joint positions of the screen 1 like in the embodiment 1.

Next, the operation thereof will be described.

As for the slip of the screen 1, it is the same as that in the embodiment 1, and the description about that will be omitted consequently.

Since the reinforcing beam 12, which is fixed to the acceptance seats 8b through the mounts 13, is pressing the Fresnel lens 1b even when the screen 1 slips, the warp of the screen 1 can be prevented.

Since the reinforcing beam 12 is made of a light metal such as aluminum, the beam 12 has durability for vibrations and shocks, and thereby the reliability of the beam 12 as the reinforcing member of the screen 1 is enhanced.

The reinforcing beam 12 is made of a material different from that of the Fresnel lens 1b, and consequently, the coefficients of linear expansion of them are different from each other. But, since the beam 12 is not formed in a body with the Fresnel lens 1b like that of the embodiment 1, the beam 12 does not prevent the slips of the screen 1.

As described above, there can be obtained the advantage that the warp of the screen 1 can be prevented while the slips of the screen 1 are secured, even if the reinforcing beam 12 is not formed in a body with the Fresnel lens 1b. There can also be obtained the advantage that the reliability to vibrations and shocks can be enhanced.

Embodiment 3.

In the embodiment 1, the one ends of the holding brackets 4 are fixed on the side of the screen 1, and the other ends of the brackets 4 are attached on the side of the acceptance seats 8a of the frame 8 in the state that the screen 1 can slip between the frame 8 and the brackets 4. But, in the present embodiment 3, the one ends of the holding brackets 4 are fixed on the side of the frame 8, and the other ends of the brackets 4 are attached on the side of the screen 1 in the state that the screen 1 can slip between the frame 8 and the brackets 4. That is to say, the other ends of the holding brackets 4 are provided with elongated holes and bushes (regulation means) so that the screen 1 can slip, like in the embodiment 1.

The screen 1 is also provided with an member corresponding to the edge side rectangular frame 2 like in the embodiment 1.

Next, the operation thereof will be described.

Since the screen 1 is pressed to the frame 8 by the other ends of the holding brackets 4 for slipping under the regulation of the pressed surface at the time of the expansion and the contraction thereof, the warp thereof and the shifts of the joint points thereof are scarcely happen.

As described above, the amount of the warp of the screen 1 can be small nearly to zero and the joint parts of the screen 1 can be fixed not to move at the time of the expansion and the contraction of the screen 1 according to the present embodiment 3. Thereby, good pictures can be obtained.

Embodiment 4.

In the embodiment 2, the reinforcing beam 12 made of a light metal is only placed to be attached on the incidence side of light of the Fresnel lens 1b, and delicate adjustments of the position thereof are required not for blocking off light.

Accordingly, in the present embodiment 4, a structure not requiring such delicate adjustments is employed. That is to say, for example, V-letter grooves (groove parts) whose cross sections are shaped in letter V are previously formed at the positions on the surface on the side of light incidence of the Fresnel lens 1b, at which positions necessary light is not blocked, and the reinforcing beam 12 is formed to be able to fit into the V-letter grooves; the structure of the present embodiment is formed by fitting the reinforcing beam 12 with the V-letter grooves.

Next, the operation thereof will be described.

The slip operation of the present embodiment when the screen 1 expands and contracts is the same as that of the embodiment 1, and the description thereof will be omitted accordingly.

When the reinforcing beam 12 is fixed to the frame 8, the beam 12 is disposed by being fitted to the previously formed V-letter grooves, and the position thereof is easily determined consequently.

As described above, the present embodiment 4 has the advantage that the work of delicate position determination becomes unnecessary, which enhances the efficiency of the fabrication thereof, in addition to the advantage same as that of the embodiment 2.

It will be appreciated from the foregoing description that, according to the first aspect of the present invention, the screen fixing structure is constructed so as to comprise a screen, a frame for securing the screen, a frame body fixed to the edge of the screen, a holder pressing the frame body to the frame for holding it, holding brackets having elongated holes disposed at central parts of respective sides of the frame body, and regulation means inserted into the elongated holes and pressing the holding bracket toward the side of the frame, and consequently, the amount of the warp of the screen can be reduced nearly to zero, and the joint parts of the screen can be fixed not to move even at the time of the expansion and the contraction of the screen according to the present embodiment. Thereby, there can be obtained the advantage that, even if the screen fixing structure is applied to a multi-projection display using liquid crystals as light bulbs, good pictures can be obtained.

Furthermore, according to the second aspect of the present invention, the screen fixing structure is constructed so that a reinforcing beam for reinforcing at least the Joint part of the screen is fixed on the surface of the screen on the side of the picture projecting means, and consequently, there can be obtained the advantages that the amount of the warp of the screen can be reduced nearly to zero owing to the screen is reinforced and that the movement of the joint parts of the screen can be prevented even at the time of the expansion and the contraction of the screen.

Furthermore, according to the third aspect of the present invention, the screen fixing structure is constructed to form a groove part on the surface of the screen where a reinforcing beam is fixed, and the structure is constructed to form the reinforcing beam so as to be able to engage with the groove part, and consequently, there can be obtained the advantage that the position of the reinforcing beam can easily be determined when the beam is fixed on the surface of the screen.

Furthermore, according to the fourth aspect of the present invention, the screen fixing structure is constructed to fix a reinforcing beam, for reinforcing at least a joint part of the screen, to the frame in the state of being attached to the surface of the screen on the side of the picture projecting means, and consequently, there can be obtained the advantages that the amount of the warp of the screen can be reduced nearly to zero owing to the screen is reinforced and that the movement of the joint parts of the screen can be prevented even at the time of the expansion and the contraction of the screen.

Furthermore, according to the fifth aspect of the present invention, the screen fixing structure is constructed to form a groove part on the surface of the screen where the reinforcing beam is attached, and the structure is constructed to form the reinforcing beam to be able to engage with the groove part, and consequently, there can be obtained the advantage that the position of the reinforcing beam can easily be determined when the beam is attached on the surface of the screen.

Furthermore, according to the sixth aspect of the present invention, the screen fixing structure is constructed to form a reinforcing beam by means of a light metal, and consequently, the strength of the reinforcing beam is increased. Thereby, there can be obtained the advantage that the reliability of the screen fixing structure is enhanced even under the condition that the structure is apt to receive vibrations and shocks.

While preferred embodiments of the present invention have been described using specific terms, such description is for illustrative purposes only, and it is to be understood that changes and variations may be made without departing from the spirit or scope of the following claims.

What is claimed is:

1. A screen fixing structure comprising:

a screen for receiving light to be projected from a picture projecting means, a frame for securing said screen, a frame body fixed to an edge of said screen on a side of said picture projecting means, a holder fixed to said frame and pressing said frame body to the frame for holding it, holding brackets having an elongated hole oriented toward a central part of said screen and disposed at central parts of respective sides of said frame body, and regulation means inserted into said elongated holes of said holding brackets and pressing the holding bracket toward a side of said frame.

2. The screen fixing structure according to claim 1, which further comprises a reinforcing beam fixed on a surface of said screen on a side of said picture protecting means for reinforcing as least a joint part of said screen.

3. The screen fixing structure according to claim 2, which further comprises a groove part formed on said surface of said screen where said reinforcing beam is fixed, said reinforcing beam capable of engaging with said groove part.

4. The screen fixing structure according to claim 2, wherein said reinforcing beam is made of a light metal.

5. The screen fixing structure according to claim 1, which further comprises a reinforcing beam fixed to said frame in a state of being attached to a surface of said screen on a side of said picture projecting means for reinforcing at least a joint part of said screen.

6. The screen fixing structure according to claim 5, which further comprises a groove part formed on said surface of said screen where said reinforcing beam is attached, said reinforcing beam capable of engaging with said groove part.

7. The screen fixing structure according to claim 5, wherein said reinforcing beam is made of a light metal.

* * * * *